(12) United States Patent
Leachman et al.

(10) Patent No.: US 10,323,794 B2
(45) Date of Patent: Jun. 18, 2019

(54) HYDROGEN FUELING SYSTEMS AND METHODS

(71) Applicant: Washington State University, Pullman, WA (US)

(72) Inventors: Jacob William Leachman, Pullman, WA (US); Jacob Thomas Fisher, Uniontown, WA (US); Ian Andrew Richardson, Port Orchard, WA (US)

(73) Assignee: Washington State University, Pullman, WA (US)

( * ) Notice: Subject to any disclaimer, the term of this patent is extended or adjusted under 35 U.S.C. 154(b) by 522 days.

(21) Appl. No.: 14/947,814

(22) Filed: Nov. 20, 2015

(65) Prior Publication Data

US 2016/0146401 A1 May 26, 2016

Related U.S. Application Data

(60) Provisional application No. 62/083,112, filed on Nov. 21, 2014.

(51) Int. Cl.
  *F17C 5/06* (2006.01)
  *F17C 5/00* (2006.01)
  *F17C 7/04* (2006.01)

(52) U.S. Cl.
  CPC ............... *F17C 5/06* (2013.01); *F17C 5/007* (2013.01); *F17C 7/04* (2013.01);
  (Continued)

(58) Field of Classification Search
  CPC .............. F17C 5/06; F17C 2221/012; F17C 2223/013; F17C 2225/0123;
  (Continued)

(56) References Cited

U.S. PATENT DOCUMENTS 8,091,593 B2   1/2012   Allidieres
2003/0164202 A1*  9/2003  Graham .................. B60S 5/02
                                                            141/98
(Continued)

FOREIGN PATENT DOCUMENTS

| EP | 2148127    | 1/2010 |
| EP | 2175187    | 4/2010 |
| EP | 2457013    | 5/2012 |
| JP | 2011080490 | 4/2011 |

OTHER PUBLICATIONS

The Extenced European Search Report dated Jun. 21, 2018 for European patent application No. 15860201.1, 12 pages.
(Continued)

*Primary Examiner* — Timothy L Maust
*Assistant Examiner* — Timothy P. Kelly
(74) *Attorney, Agent, or Firm* — Lee & Hayes, P.C.

(57) ABSTRACT

A hydrogen fueling system and method comprises a container, a first tank, second tank, and third tank disposed within the container, and a nozzle coupled to the second tank and the third tank. One or more computer-readable storage media storing instructions executable by one or more processors may control flow of liquid hydrogen and hydrogen gas in the system, adjust temperature of the tanks, control pressure in the tanks, and transfer hydrogen gas from the second tank, the third tank, or a combination thereof to one or more target vessels. The system may also comprise flow control assemblies and flow control valves to manage the transfer of liquid hydrogen and hydrogen gas in the system.

20 Claims, 12 Drawing Sheets

(52) U.S. Cl.
CPC ............... *F17C 2203/0366* (2013.01); *F17C 2203/0375* (2013.01); *F17C 2203/0387* (2013.01); *F17C 2205/018* (2013.01); *F17C 2205/0111* (2013.01); *F17C 2205/0138* (2013.01); *F17C 2205/0142* (2013.01); *F17C 2205/0326* (2013.01); *F17C 2221/012* (2013.01); *F17C 2221/033* (2013.01); *F17C 2223/0161* (2013.01); *F17C 2223/033* (2013.01); *F17C 2223/046* (2013.01); *F17C 2225/0123* (2013.01); *F17C 2225/0161* (2013.01); *F17C 2225/036* (2013.01); *F17C 2227/0135* (2013.01); *F17C 2227/0157* (2013.01); *F17C 2227/0302* (2013.01); *F17C 2227/0311* (2013.01); *F17C 2227/0341* (2013.01); *F17C 2227/0383* (2013.01); *F17C 2227/0386* (2013.01); *F17C 2227/043* (2013.01); *F17C 2227/047* (2013.01); *F17C 2250/01* (2013.01); *F17C 2250/032* (2013.01); *F17C 2250/043* (2013.01); *F17C 2250/0439* (2013.01); *F17C 2265/065* (2013.01); *F17C 2270/0139* (2013.01); *Y02E 60/321* (2013.01); *Y02P 90/45* (2015.11)

(58) Field of Classification Search
CPC ............ F17C 2227/041; F17C 2250/03; F17C 2270/01; F17C 5/007; F17C 7/04
See application file for complete search history.

(56) References Cited

U.S. PATENT DOCUMENTS

| | | |
|---|---|---|
| 2004/0040316 A1 | 3/2004 | Bradley et al. |
| 2007/0106543 A1 | 5/2007 | Baughman et al. |
| 2007/0246121 A1 | 10/2007 | Michel et al. |
| 2010/0023162 A1 | 1/2010 | Gresak et al. |
| 2012/0159970 A1 | 6/2012 | Reese et al. |

OTHER PUBLICATIONS

PCT Search Report and Written Opinion dated Mar. 11, 2016 for PCT Application No. PCT/US15/61985, 9 pages.

Richardson, et al., "Drop-in Hydrogen Fueling Station", retrieved on Feb. 23, 2016 at <<http://www.hydrogencontest.org/pdf/2014/WSU_2014_HEF_CONTEST.pdf>>, Washington State University, 2014, 34 pages.

* cited by examiner

_US 10,323,794 B2_

HYDROGEN FUELING SYSTEMS AND METHODS

CROSS REFERENCE TO RELATED APPLICATION

This application claims priority to U.S. Provisional Patent Appln. No. 62/083,112 filed Nov. 21, 2014, entitled "System Utilizing Autogenous Pressurization of Cryogenic Hydrogen for Fueling of Automotive Vehicles," which is incorporated by reference in its entirety.

BACKGROUND

Hydrogen can be considered an alternative fuel source to gasoline. Automobiles have been developed that utilize hydrogen instead of gasoline as a power source. A hydrogen-powered vehicle may have a tank that holds hydrogen gas, which is used to power the vehicle. When the hydrogen within the tank is expended, the tank must be refilled, much like a gasoline-powered vehicle must be refueled when its gasoline tank runs low. Currently, hydrogen vehicle refueling is limited to locations with hydrogen delivery infrastructure, such as hydrogen pipelines. Also, current hydrogen fueling can be time consuming and can result in wasted hydrogen gas from incomplete filling or differing tank sizes. These existing fueling stations increase the cost of operation, increase the potential for hazardous station conditions, and limit fueling locations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
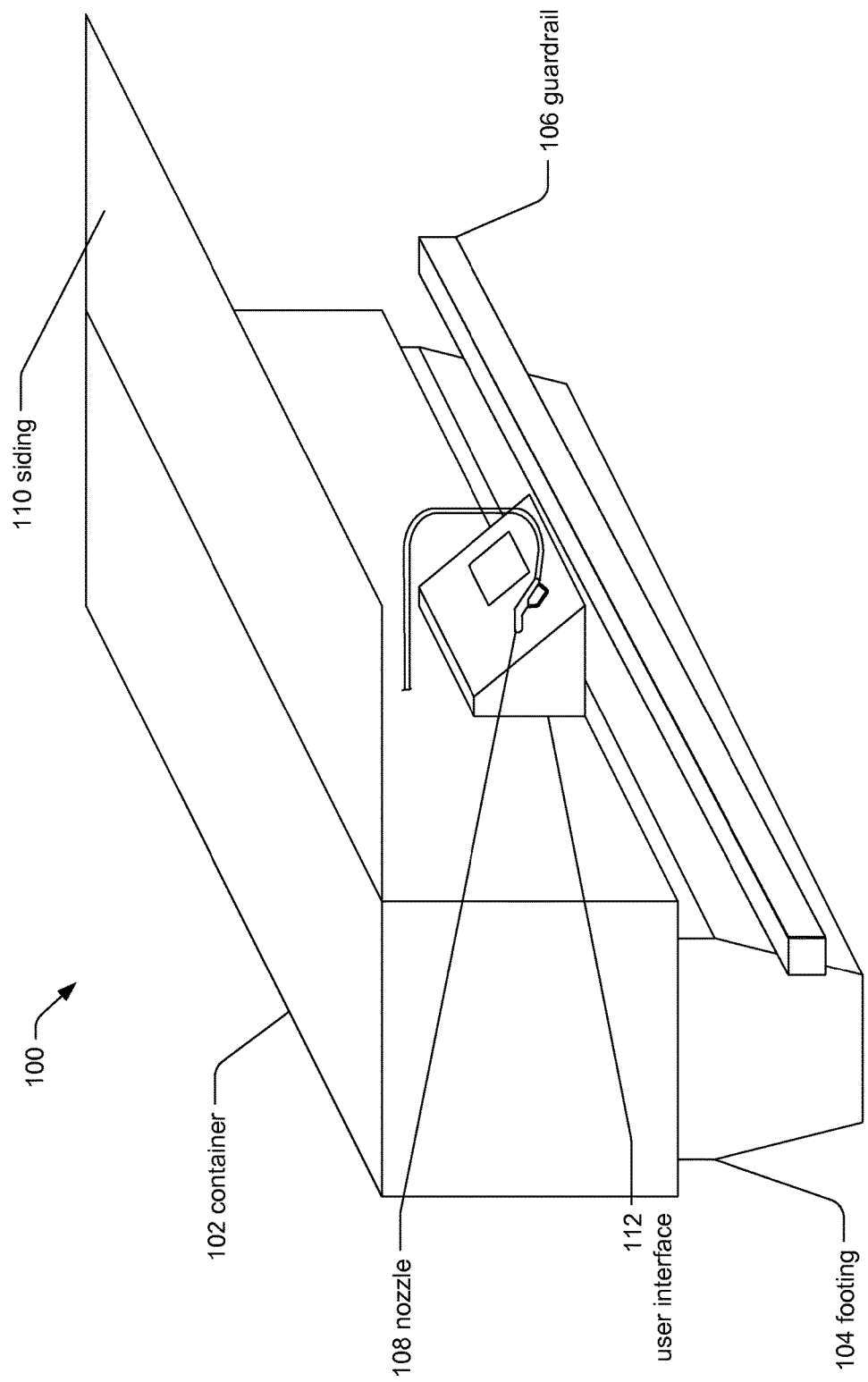
FIG. 1 illustrates a perspective view of an example hydrogen fueling system.

This disclosure describes systems and methods for fueling a target tank with hydrogen.

As discussed above, current hydrogen fueling systems increase the cost of operation, increase the potential for hazardous station conditions, and limit fueling locations. Example systems and methods as described herein alleviate the shortcomings of current hydrogen fueling systems by employing an autogenous two-stage hydrogen fueling process that maximizes the use of hydrogen gas in the fueling system in a self-contained environment that can be easily transported and replaced. The system comprises a liquid hydrogen storage tank and various additional tanks that allow for vaporization of the liquid hydrogen to hydrogen gas, and storage of hydrogen gas at differing pressures and temperatures to assist in efficient dispensing of hydrogen gas to target vessels, such as hydrogen-powered vehicles.

In some examples, a hydrogen fueling system may include a first tank, a second tank, and a third tank disposed within a container. The first tank may be sized to receive and store liquid hydrogen. Hydrogen will take on a liquid state at atmospheric pressure at approximately −253° C. (−424° F.; 20.3 K). As such, the first tank may be made of materials that hold liquids at or below such a temperature. The second tank may be coupled to the first tank and may allow the liquid hydrogen to flow from the first tank to the second tank. The first tank may be larger than the second tank. Additionally, when liquid hydrogen flows from the first tank to the second tank, all or a portion of the liquid hydrogen in the first tank may flow into the second tank. The first tank may be maintained at atmospheric pressure, or the first tank may be pressurized, such as, for example, to approximately 5 bar. When the liquid hydrogen is received within the second tank, the second tank may be heated or otherwise maintained at a temperature that allows vaporization or boiling of the liquid hydrogen to hydrogen gas. As the liquid hydrogen vaporizes, pressure within the second tank may increase. For example, pressure within the second tank may increase from approximately 5 bar to approximately 1,100 bar. The liquid hydrogen may vaporize within the second tank until all or nearly all of the liquid hydrogen is converted to hydrogen gas.

The third tank may be coupled to the second tank, and all or a portion of the hydrogen gas within the second tank may be transferred from the second tank to the third tank. The hydrogen gas within the third tank may be maintained at a pressure that is less than or equal to the pressure within the second tank. For example, pressure within the third tank may be maintained at approximately 414 bar. The hydrogen gas in the third tank may be stored at such a pressure until it is dispensed, while the second tank can be refilled with liquid hydrogen and allowed to vaporize the liquid hydrogen to hydrogen gas. By so doing, the system can maintain one tank at a high pressure (second tank) and one tank at an intermediate lower pressure (third tank). The hydrogen fueling station may also comprise a nozzle configured to receive hydrogen gas from the second tank, the third tank, or a combination thereof. The nozzle may allow for transfer of hydrogen gas to one or more target vessels such that, in some examples, the target vessels are filled to a threshold percentage of capacity by the third tank and then the higher-pressure second tank gas fills the remainder of the target vessels.

The system may include one or more valves, sensors, manifolds, meters, controllers, actuators, and other components that assist in the transfer of liquid hydrogen or hydrogen gas between the various tanks and components of the system. The hydrogen fueling station may also comprise one or more computer-readable storage media storing instructions executable by one or more processors to perform one or more operations. The operations may comprise controlling flow of the liquid hydrogen from the first tank to the second tank, and controlling flow of the hydrogen gas from the second tank to the third tank. The operations may also comprise adjusting and maintaining the temperatures of the first tank, the second tank, the third tank, or a combination thereof. The operations may further comprise controlling pressure in the first tank, the second tank, the third tank, or a combination thereof as described above. The operations may further comprise transferring hydrogen gas to one or more target vessels.

In another example, a hydrogen fueling system such as the one described above may further comprise one or more flow control assemblies disposed within the container, the flow control assemblies having one or more flow control valves. The one or more flow control assemblies may control flow of the liquid hydrogen and the transfer of the hydrogen gas. The one or more flow control valves may also control the transfer and amount of hydrogen gas from the second tank to a target vessel, and from the third tank to the target vessel. The one or more flow control valves may prohibit transfer of hydrogen gas from the second tank when the target container is below a threshold percentage of capacity. The one or more flow control valves may also prohibit transfer of hydrogen gas from the third tank when the target vessel is at or above the threshold percentage of capacity.

In another example, a method of operating a hydrogen fueling system such as that described herein may include storing liquid hydrogen in a first tank disposed within a container. The liquid hydrogen may be transferred from the first tank to a second tank. The liquid hydrogen may be vaporized or boiled in the second tank to convert all or a portion of the liquid hydrogen to hydrogen gas. All or a portion of the hydrogen gas may be transferred from the second tank to a third tank. The hydrogen gas from the third tank may be transferred to a target vessel when the target vessel is below a threshold percentage of capacity. The hydrogen gas from the second tank may be transferred to the target vessel when the target vessel is at or above the threshold percentage of capacity.

Hydrogen fueling systems according to this disclosure may be designed for fueling of a variety of target containers, such as, for example, hydrogen-powered vehicles (such as, for example, hydrogen-combustion vehicles and vehicles that run on hydrogen fuel cells), hydrogen fuel cells, generators, and other hydrogen storage containers.

One or more examples of the present disclosure are illustrated in the accompanying drawings. Those of ordinary skill in the art will understand that the systems and methods specifically described herein and illustrated in the accompanying drawings are non-limiting examples and that the scope of these examples is defined solely by the claims. The features illustrated or described in connection with one example may be combined with the features of other examples. For example, the compressor described in one example may be included in the system comprising the computing devices. Such modifications and variations are intended to be included within the scope of the appended claims.

Additional details are described below with reference to several examples.

EXAMPLE SYSTEMS

FIGS. 1-9 illustrate various examples of a hydrogen fueling system. FIGS. 1-9 show a schematic view of various examples of a hydrogen fueling system. The sizes, shapes, and symbols used to describe the various components of the systems are used for illustration only and should not be used as limitations of the systems as described herein.

FIG. 1 is a perspective view of an example of a hydrogen fueling system 100. System 100 may comprise a container 102. The container 102 may be an intermodal container or other standardized shipping container. The container 102 may be used in various methods of transport, such as by ship, rail, and/or truck. The container 102 may also be described as a cargo or freight container, a shipping container, a Conex box, or an ISO container, for example, which may be prevent or hinder water from entering the interior of the container 102. The container 102 may have various notches and components that allow for the container to be secured to various vehicles, lifted from vehicle to vehicle, placed at its operating location, or otherwise fastened. These various components may include twistlock fittings and vibration dampening pads. In some examples, the container 102 may also have a peaked roof, if desired, to shed rain or snow. In some examples, the container 102 may be connected to a power grid and/or on-site water. In other examples, the container 102 may be self-contained and configured for operation "off-grid." Installation or removal of container 102 may be accomplished in less than 24 hours, which may provide a hydrogen fueling station in a location that did not provide hydrogen fueling capabilities in a relatively short time.

FIG. 1 also shows a footing 104 that may be coupled to the container 102. The footing 104 may be sized to rest above ground and hold the container 102 above ground level. In some examples, the footing 104 may be a component of the container 102, or may be a separate component attached to the container 102. For example, the footing 104 may be the chassis from the transport vehicle that delivered the container 102. System 100 may include a number of components disposed on the exterior of the container 102. For example, system 100 may comprise a guardrail 106, which may be coupled to the footing 104. The guardrail 106 may define a barrier between the container 102 and vehicles, people, and other objects utilizing the system 100. The guardrail 106 may prevent or restrict vehicles from intentionally or accidentally making contact with the container 102, which could potentially damage the container 102 and its interior contents that may contain liquid hydrogen and hydrogen gas. In some examples, one or more nozzles 108 may be disposed at least partially on the exterior of the container 102. As will be more fully described below, nozzles 108 may transfer hydrogen gas from components within the container 102 to a target vessel, such as, for example, a hydrogen fuel tank in a hydrogen-powered vehicle. FIG. 1 shows system 100 with one nozzle 108. However, the present disclosure is not limited to one nozzle 108, and instead, the presently disclosed systems may include one, two, or more nozzles 108. The nozzles 108 may be easy-to-use fueling nozzles with data interface and breakaway coupling to facilitate hydrogen dispensing in a quick, easy-to-use, and safe manner. The nozzles 108 may interface with the target vessel and provide profiles of different types of target vessels to more accurately dispense hydrogen gas.

System 100 may also comprise one or more user interfaces 112 that may be configured to allow users of system 100 to interact with system 100. The user interfaces 112 may include various computing components and displays, such as, for example, computer-readable medium storing instructions, processors, hardware, applications, and touchscreens. In some examples, the user interfaces 112 may include tablet computers or similar devices. The user interfaces 112 may display information to users that may assist in use of system 100. The information may comprise stepwise instructions, advertisements, and safety information, for example. In some examples, the user interfaces 112 may allow users to tap, click, press, or otherwise initiate the hydrogen transfer process. The user interfaces 112 may instruct users on how to connect a nozzle 108 to a vehicle and how to select payment types. The user interfaces 112 may also show or otherwise inform a user of the capacity of the user's hydrogen fuel tank, the current percent of capacity of the tank, and an estimation of fueling progress during hydrogen gas transfer. The user interfaces 112 may also provide a user with the cost to the user for the hydrogen gas transfer and the amount (e.g., mass) of hydrogen gas being transferred to the user's tank. The user interfaces 112 may provide users with an option to obtain a receipt, whether physical or electronic. Furthermore, the user interfaces 112 may provide troubleshooting or "Help" information for users having difficulty using system 100, as well as means for alerting the system operator to emergency conditions. The troubleshooting information may include a live video chat with a remote operator. FIG. 1 shows system 100 with two user interfaces 112. However, the present disclosure is not limited to two user interfaces 112, and instead, the presently disclosed systems may include one, two, or more user interfaces 112.

System 100 may also comprise a siding 110 that may cover all or a portion of the container 102 when the container 102 is not in use or is being transported. The siding 110 may be designed to pivot, hinge, or otherwise move to allow access to components disposed on the exterior of the container 102, such as, for example, the nozzles 108 and the user interfaces 112. The siding 110 may also function as an awning, which may protect components disposed on the exterior of the container 102 from rain or other weather conditions. System 100 may also comprise additional components to aid in use of the system, such as, for example, a door in container 102 to allow authorized personnel to access the interior contents of the container 102. Container 102 may include ducts or other openings in its top or ceiling portions as well as one or more fans, which may be spark-proof, for ventilation. The ducts and fans may be used to remove heat and vent leaked hydrogen gas from within the container 102.

Figure 2:
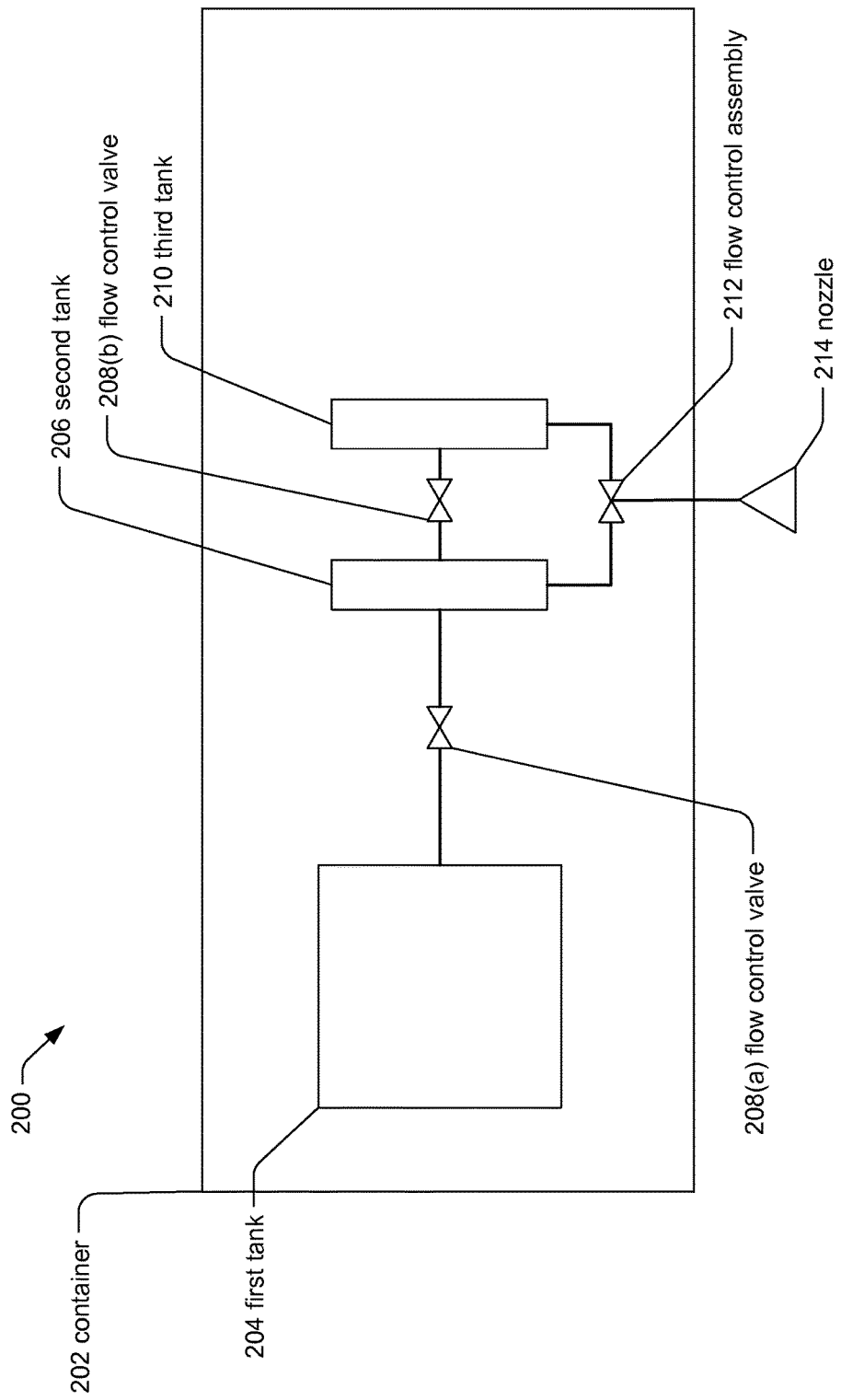
FIG. 2 illustrates a schematic diagram of an example of a hydrogen fueling system.

FIG. 2 illustrates an example of a hydrogen fueling system 200 that includes a container 202, such as, for example, container 102 in FIG. 1. A first tank 204 may be disposed within the container 202 and may be sized to receive and store liquid hydrogen. The first tank 204 may be of varying shapes and sizes and may hold various quantities of liquid hydrogen. For example, the first tank 204 may be large enough to hold approximately 725 kg of hydrogen, such as, for example, a 11,924 liter (3,150 gallon) tank. The first tank 204 may have an access port or other opening, such as a Compressed Gas Association connection, to allow liquid hydrogen to be received within the first tank 204 from an exterior source, such as by a tanker truck carrying liquid hydrogen. A second tank 206 may also be disposed within the container 202 and may be coupled to, or in fluid communication with, the first tank 204. The coupling of the first tank 204 and the second tank 206 may be achieved through piping that allows for the transfer of liquid hydrogen to the second tank 206 without vaporizing or with limited vaporization. A flow control valve 208(a) may be used to regulate liquid hydrogen flow to the second tank 206. The flow control valve 208(a) may be disposed on the first tank 204, on the second tank 206, or in relation to the piping allowing coupling between the first tank 204 and the second tank 206.

The first tank 204 may comprise a vapor cooled shielding liner for cryogenic storage. For example, first tank 204 may include all or a portion of the features described in U.S. patent application Ser. No. 14/810,597, which is incorporated herein by reference. Without limiting the incorporation by reference stated above, the first tank 204 may comprise a storage volume configured to contain a cryogenic fluid. The first tank 204 may also comprise a primary passageway configured as one or more primary channels surrounding the storage volume, wherein the one or more primary channels are further configured to enable a catalyzed vapor of the cryogenic fluid. The first tank 204 may also comprise one or more secondary passageways, each of which may be additionally configured as one or more secondary channels surrounding the storage volume and the primary passageway. The one or more primary channels may be in combination with the one or more secondary channels collectively, and may collectively receive catalyzed vapor therethrough so as to provide for a plurality of insulating vapor layers that absorb heat from a source. The various channels and passageways may be configured to enable hydrogen flow communication between separate channels and passageways. The passageways can be appropriately spaced to incorporate continuous layers of insulating materials.

As the liquid hydrogen vaporizes to hydrogen gas, the hydrogen gas may enter one or more of the primary passageways and be recirculated through one or more secondary passageways. The hydrogen gas may be eventually directed out of the passageways and toward a fuel cell (described below) to power a system. The first tank 204 may comprise any number of passageways and channels. For example, the first tank 204 may comprise from 2 to 40 passageways, each of which may have one or more channels. Each such passageway may act as an insulating layer. The channels can be spaced appropriately or stacked to allow continuous insulation layers between channels or between the channels and storage volume. The channels and passageways may also have varying widths and length, and may be uniform or different from each other in width and length.

One issue that may arise in the storage of liquid hydrogen in the first tank 204 is deleterious boil-off rates. To resolve this issue, the first tank 204 may employ vapor cooled shielding as described above so as to increase the cooling capacity of resultant hydrogen vapors. In particular, increasing the cooling capacity of hydrogen vapors and using it as a vapor shield may be possible through manipulating hydrogen's nuclear spin isomers, called orthohydrogen and parahydrogen. However, due to quantum mechanics principals, parahydrogen is stuck in even rotational energy levels and cannot access the odd rotational energy levels of orthohydrogen without a catalyst.

Thus, the systems described herein may capitalize on the odd rotational energy levels of orthohydrogen. Specifically, a number of the channels may comprise a catalyst, such as, but not limited to a paramagnetic material (e.g., $Fe(OH)_3$ or $CrO_3$), which for example, can be, but not necessarily, configured as a coating on the surface of the inner walls of the passageways or as a mixture of a para to ortho catalyst (e.g., finely granulated para to ortho catalyst), such as the aforementioned particulate paramagnetic material (e.g., ferric oxide) embodied in a foam-forming material that is disposed within a particular passageway. Other catalyst materials that can also be utilized herein within a passageway include activated carbon, platinized asbestos, rare earth metals, uranium compounds, predetermined nickel compounds, or para to ortho catalysts implemented in light-weight aerogels.

The second tank 206 may be controlled or otherwise maintained at a temperature that allows for vaporization or boiling of the liquid hydrogen when received within the second tank 206. As described above, the boiling point of hydrogen at atmospheric pressure is approximately −252° C. The second tank 206 may be controlled or maintained at or below that temperature to allow all or a portion of the liquid hydrogen in the second tank 206 to vaporize into hydrogen gas. Pressure in the second tank 206 may also vary, which may impact the required temperature to vaporize the liquid hydrogen. As the liquid hydrogen is converted to hydrogen gas, pressure within the second tank 206 may increase, and in some cases, that increase may be substantial. For example, the liquid hydrogen may enter the second tank 206 at atmospheric or slightly above atmospheric pressure, such as, for example, 5 bar. Vaporization may cause the pressure within the second tank 206 to increase, such as, for example, to 1,100 bar or more. This process of vaporization liquid hydrogen as described herein may resemble autogenous pressurization or cryo-compression.

A third tank 210 may also be disposed within the container 202 and may be coupled to the second tank 206. In some examples, the third tank 210 may be attached directly to the second tank 206 without the use of piping or other coupling means. In other examples, the third tank 210 may be coupled to the second tank 206 through piping that allows for transfer of hydrogen gas to the third tank 210. Another flow control valve 208(b) may be used to regulate hydrogen gas transfer to the third tank 210. The flow control valve 208(b) may be disposed on the second tank 206, on the third tank 210, or in relation to piping coupling the second tank 206 and the third tank 210. Hydrogen gas may be transferred from the second tank 206 to the third tank 210 until the pressure within the third tank 210 is at or below the pressure in the second tank 206. For example, in some examples, the pressure in the second tank 206 may be approximately 1,100 bar. A portion of the hydrogen gas in the second tank 206 may be transferred to the third tank 210 until a desired pressure within the third tank 210 is reached, for example, 414 bar. Although example pressures for the first tank 204, the second tank 206, and the third tank 210 are provided herein, various pressures and ranges or pressures may be used. For example, pressure in the first tank 204 may be 1 bar, 1 to 5 bar, 1 to 10 bar, or more. Pressure in the second tank 206 may be greater than 1 bar, between 1 bar and 1,100 bar, or greater than 1,100 bar. Pressure in the third tank 210 may be 414 bar, or between 1 bar and 1,100 bar, or between 400 bar and 500 bar.

Once the desired pressure is reached in the third tank 210, the flow control valve 208(b) may prevent further transfer of hydrogen gas from the second tank 206. In some examples, the second tank 206 and the third tank 210 may be of similar or different sizes. For example, the second tank 206 may be smaller (have less volume) than the third tank 210 such that when hydrogen gas is transferred from the second tank 206 to the third tank 210, all or nearly all the hydrogen gas is transferred such that the third tank 210 achieves a desired pressurization and the second tank 206 is depressurized to allow for additional liquid hydrogen to be transferred to the second tank 206. By way of example, the second tank 206 may have a volume of approximately 62 liters, while the third tank 210 may have a volume of approximately 787 liters.

System 200 may comprise a flow control assembly 212 which may be coupled to the second tank 206 and the third tank 210. The flow control assembly 212 may be a manifold or other mechanism that may comprise one or more flow control valves, such as, for example, flow control valves 208, that can allow transfer of hydrogen gas from the second tank 206 to a target vessel or from the third tank 210 to the target vessel, or that may prevent hydrogen gas from being transferred from either or both the second tank 206 and the third tank 210 to the target vessel. The flow control assembly 212 may include one valve, two valves, or more valves. Each of the valves in the flow control assembly 212 may control hydrogen gas transfer from the second tank 206, the third tank 210, or both. The flow control assembly 212 as depicted in FIG. 2 shows one component, however, the flow control assembly 212 may be multiple components coupled to the second tank 206, the third tank 210, or a combination thereof. System 200 may also comprise one or more hydrogen mass flow meters to determine the mass of hydrogen being transferred from the second tank 206, the third tank 210, or a combination thereof.

FIG. 2 further illustrates a nozzle 214 that may be coupled to the second tank 206, the third tank 210, or a combination thereof. The nozzle 214 may be similar to nozzle 108 shown in FIG. 1. The nozzle may be sized and configured to be received at least partially into or by a target vessel or entry port into a target vessel. Although FIG. 2 depicts one nozzle 214, multiple nozzles 214 may be included in system 200.

As used herein, the various tanks that make up components of examples of the system may also be described as containers, housings, or vessels, for example.

The various components of system 200 may operate as described below. Liquid hydrogen may be stored in the first tank 204 at a first pressure. The liquid hydrogen may be transferred to the second tank 206 through a flow control valve 208(a). The liquid hydrogen may be vaporized in the second tank 206 to hydrogen gas at a second pressure, the second pressure may be greater than the first pressure. All or a portion of the hydrogen gas in the second tank 206 may be transferred to the third tank 210 through a flow control valve 208(b) until the third tank 210 reaches a third pressure, the third pressure may be less than or equal to the second pressure. By way of example, the first pressure may be less than or equal to about 5 bar; the second pressure may be greater than or equal to about 1,100 bar, and the third pressure may be between 5 bar and 1,100 bar. These pressures may be maintained until system 200 is used. A user may insert the nozzle 214 into a target vessel or port and initiate transfer of hydrogen gas from system 200 to the target vessel.

Hydrogen gas may be dispensed from the second tank 206, the third tank 210, or a combination thereof through the flow control assembly 212. By way of example, an analysis of the target vessel can be performed to determine if the target vessel is at a threshold percentage of capacity. If the target vessel is at or above the threshold percentage of capacity, then the hydrogen gas in the second tank 206 may be transferred to the target vessel. If the target vessel is below the threshold percentage of capacity, then the hydrogen gas in the third tank 210 may be transferred to the target vessel until the threshold percentage of capacity is reached, then hydrogen gas from the second tank 206 may be transferred to the target vessel. The examples provided below illustrate the potential distribution of hydrogen gas from the second tank 206 and the third tank 210. These examples assume a threshold percentage of 75% tank capacity, which is a non-limiting example.

Example 1 (Target Tank Initially At 25% of Capacity)

Since the target vessel is at only 25% capacity, hydrogen gas may be transferred from the third tank 210 to the target vessel. The hydrogen gas from the third tank 210 is transferred to the target vessel until the target vessel reaches 75% capacity. At that time, hydrogen gas may no longer be transferred from the third tank 210. Since the target vessel has reached the threshold percentage of capacity, hydrogen gas from the second tank 206 may be transferred into the target vessel until the target vessel has reached full capacity, or until transfer is otherwise interrupted or stopped.

Example 2 (Target Tank Initially At 80% of Capacity)

Since the target vessel is already above the 75% threshold percentage, no hydrogen gas may be transferred from the third tank 210 to the target vessel. Instead, only hydrogen gas from the second tank 206 may be transferred to the target vessel until the target vessel has reached full capacity, or until transfer is otherwise interrupted or stopped.

Example 3 (Incomplete Fill)

An analysis determines that the target vessel is at 0% of capacity. Because the target vessel is at less than 75% capacity, hydrogen gas may be transferred from the third tank 210 to the target vessel. However, during transfer, a user may stop the transfer process at 70% of the target vessel's capacity. In such an example, hydrogen gas from the second tank 206 is not transferred to the target vessel during the transfer process because the target vessel did not reach the threshold percentage of capacity.

In some examples, the systems described herein may be optimized for transferring hydrogen gas to a target vessel initially containing a certain percentage of capacity, such as, for example, 25% capacity. When a target vessel contains the optimized initial capacity, transfer of hydrogen from the systems to the target vessel may result in little or no excess or deficient amount of hydrogen once 100% target vessel capacity is reached. However, when the systems are optimized, target vessel initial capacities that deviate from the optimized percentage of capacity may cause an excess or deficiency of hydrogen gas in the system, which is discussed in more detail below with respect to FIG. 3.

Percentage of capacity, as used herein, may refer to the percentage of mass of hydrogen in a target vessel compared to the maximum mass of hydrogen that the target vessel may receive. For example, a target vessel may be configured to hold approximately 5 kg of hydrogen gas; transferring hydrogen to 100% capacity would entail transferring hydrogen gas to the target vessel until 5 kg of hydrogen gas are present in the target vessel. Additionally, percentage of capacity may refer to the percentage of pressurization of the target vessel compared to the maximum (or optimal) pressurization of the target vessel. For example, a target vessel may be configured to support 700 bar pressurization of hydrogen gas; transferring hydrogen to 100% capacity would entail transferring hydrogen gas to the target vessel until 700 bar of pressure is reached within the target vessel.

Figure 3:
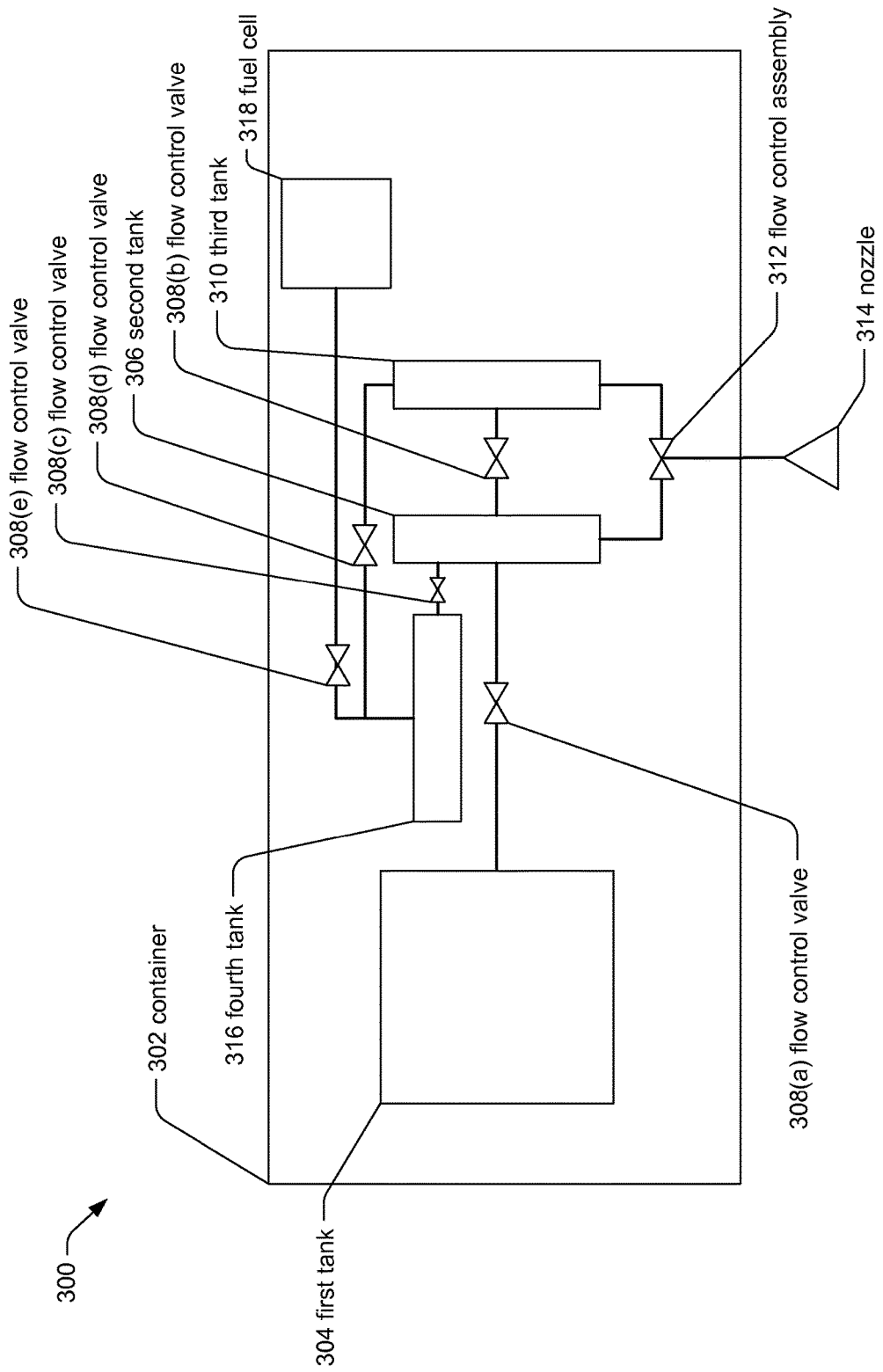
FIG. 3 illustrates a schematic diagram of another example of a hydrogen fueling system.

FIG. 3 illustrates an example of a hydrogen fueling system 300, in which a fourth tank 316 and a fuel cell 318 are disposed within the container 302. System 300 may have the same or similar components as those shown in FIG. 2. For example, system 300 may comprise a container 302, a first tank 304, a second tank 306, one or more flow control valves 308(*a*)-(*e*), a third tank 310, a flow control assembly 312, and a nozzle 314. The fourth tank 316 of system 300 may be coupled to the second tank 306 and the third tank 310. Flow control valves 308(*c*)-(*d*) may control the transfer of hydrogen gas from the second tank 306 to the fourth tank 316, from the fourth tank 316 to the third tank 310, or a combination thereof. In some examples, the fourth tank 316 may hold unused or overflow hydrogen gas from the second tank 306. For example, during transfer of hydrogen gas from the second tank 306 to the third tank 310, or during transfer of hydrogen gas from the second tank 306 to a target vessel, a portion of the hydrogen gas in the second tank 306 may not be transferred and may remain in the second tank 306. The remainder of hydrogen gas may be transferred to the fourth tank 316 to allow the pressure in the second tank to reduce to atmospheric pressure or to a pressure similar to that in the first tank 304. The remainder hydrogen gas in the fourth tank 316, or a portion thereof, may be transferred to the third tank 310 when additional hydrogen gas or pressure is needed in the third tank 310. The remainder hydrogen gas in the fourth tank 316, or a portion thereof, may also be transferred to a fuel cell 318 disposed within the container 302 and in electronic communication with the various components of system 300. The hydrogen gas may be transferred through flow control valve 308(*e*). The fuel cell 318 may utilize the hydrogen gas transferred from the fourth tank 316 to provide energy to control the operation of the various components of systems described in the present disclosure. The fuel cell 318 may also provide auxiliary power to system 300 in the event of a power outage or emergency shutdown. The fuel cell 318 may be configured to power system 300 for at least 48 hours to provide sufficient time for emergency personnel to respond and rectify emergency conditions.

In some examples, the fourth tank 316 may also be coupled to the first tank 304. The liquid hydrogen in the first tank 304 may undergo some boil-off or vaporization despite being cooled as described above. This rate of boil-off may be, for example, 0.3% per day. This vaporized hydrogen may be transferred from the first tank 304 to the fourth tank 316 and/or to the fuel cell 318 to produce electricity to run system 300.

Figure 4:
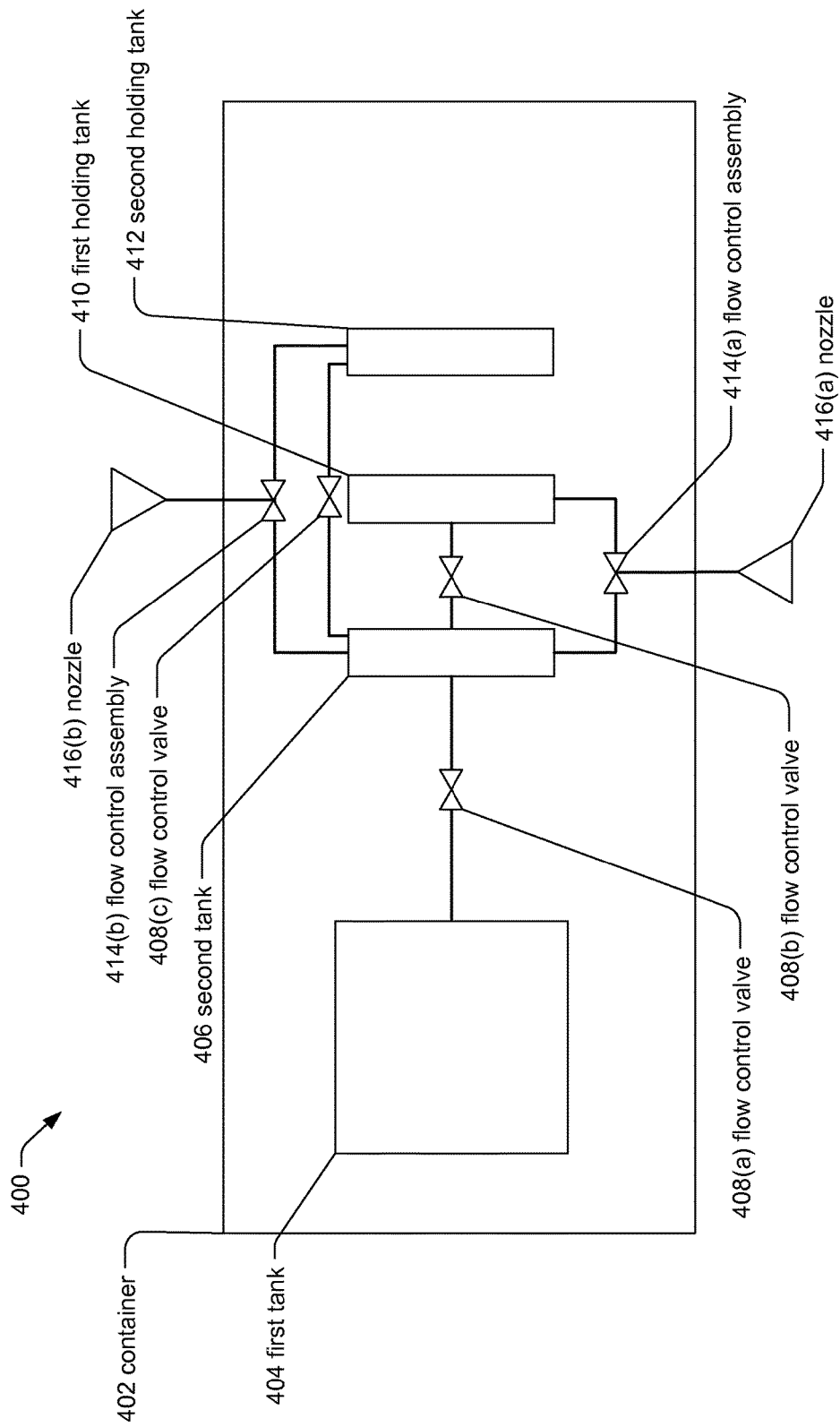
FIG. 4 illustrates a schematic diagram of a further example of a hydrogen fueling system.

FIG. 4 illustrates an example hydrogen fueling system 400 in which one or more holding tanks are disposed with the container 402. System 400 may have the same or similar components as those shown in FIG. 2. For example, system 400 may comprise a container 402, a first tank 404, a second tank 406, one or more flow control valves 408(*a*)-(*c*), one or more flow control assemblies 414(*a*)-(*b*), and one or more nozzles 416(*a*)-(*b*). FIG. 4 depicts two holding tanks, a first holding tank 410 and a second holding tank 412. The first holding tank 410 and the second holding tank 412 may be similar to the third tank 210 in FIG. 2. The first holding tank 410 may be coupled to the second tank 406 such that hydrogen gas may be transferred from the second tank 406 to the first holding tank 410 through a flow control valve 408(*b*). The second holding tank 412 may be coupled to the second tank 406 such that hydrogen gas may be transferred from the second tank 406 to the second holding tank 412 through another flow control valve 408(*c*). In this example, the second tank 406 may provide hydrogen gas to both or either the first holding tank 410 and the second holding tank 412.

In some examples, system 400 can dispense hydrogen gas to multiple target vessels in parallel or sequentially. For example, transfer of hydrogen gas to one target vessel can be achieved through transfer from the first holding tank 410 and the second tank 406. Transfer of hydrogen gas to another target vessel can be achieved through transfer from the second holding tank 412 and the second tank 406. FIG. 4 depicts the two nozzles 416(a)-(b) on opposing sides of the container 402. However, this disclosure includes examples wherein the nozzles 416 may be on the same side of the container 402, on opposing sides of the container 402, or on adjoining sides of the container 402.

Figure 5:
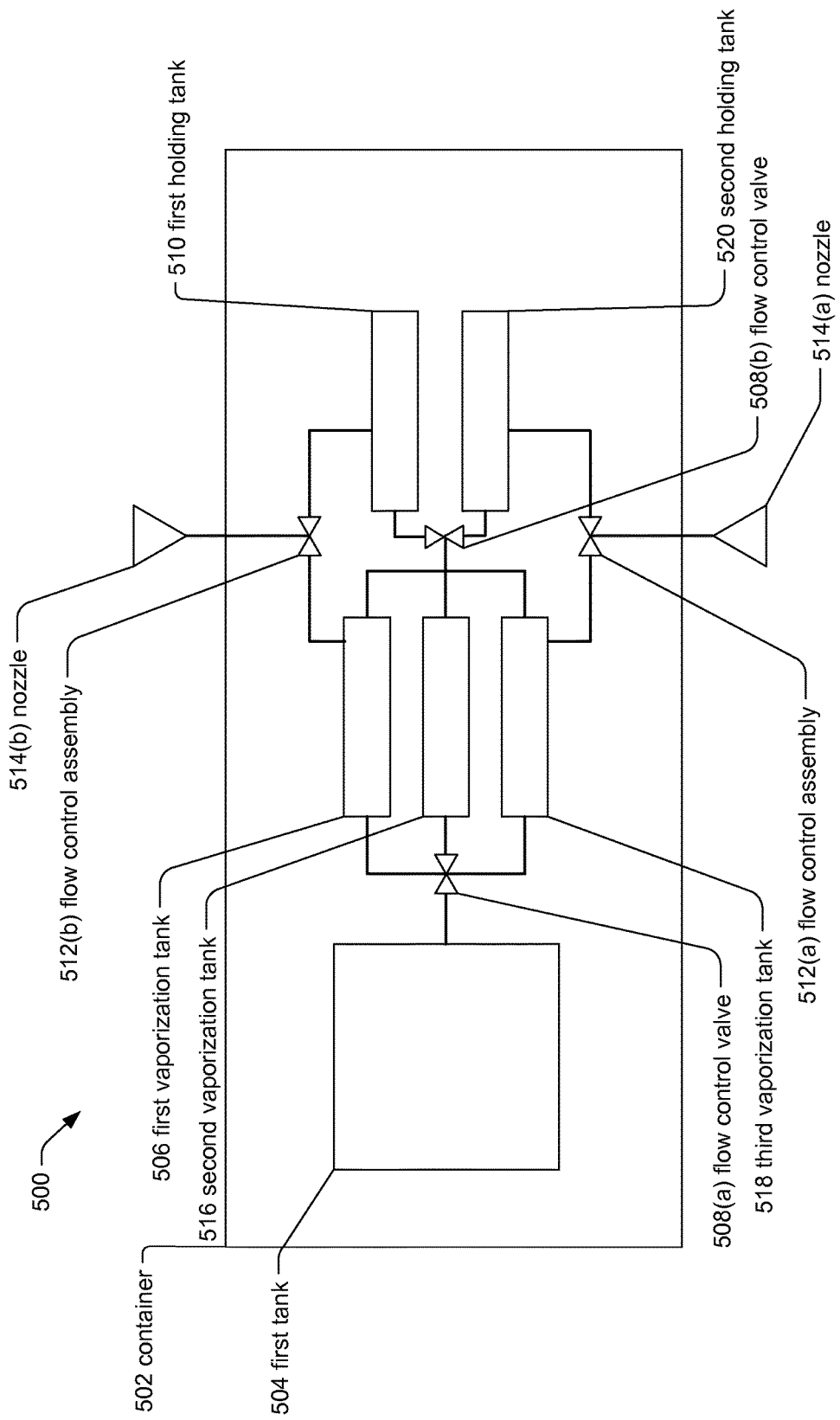
FIG. 5 illustrates a schematic diagram of a further example of a hydrogen fueling system.

FIG. 5 illustrates an example hydrogen fueling system 500 in which one or more vaporization tanks are disposed within the container 502. System 500 may comprise the same or similar components as those shown in FIG. 2. For example, system 500 may comprise a container 502, a first tank 504, one or more flow control valves 508(a)-(b), one or more flow control assemblies 512(a)-(b), and one or more nozzles 514(a)-(b). System 500 may also comprise one or more holding tanks (i.e., a first holding tank 510 and a second holding tank 520). The first holding tank 510 and the second holding tank 520 may be similar to the first holding tank 410 and the second holding tank 412 in FIG. 4, respectively. Additionally, FIG. 5 depicts three vaporization tanks, a first vaporization tank 506, a second vaporization tank 516, and a third vaporization tank 518. The vaporization tanks may be similar to the second tank 206 in FIG. 2. The vaporization tanks may be coupled to the first tank 504. Each of the vaporization tanks may also be coupled to the first holding tank 510, the second holding tank 520, or both through one or more flow control valves 508(a)-(b). As such, hydrogen gas may be transferred from the first vaporization tank 506 to the first holding tank 510 and/or the second holding tank 520. Hydrogen gas may also be transferred from the second vaporization tank 516 to the first holding tank 510 and/or the second holding tank 520. Hydrogen gas may also be transferred from the third vaporization tank 518 to the first holding tank 510 and/or the second holding tank 520.

The example depicted in FIG. 5 may allow for parallel or sequential transfer of hydrogen gas into two target vessels. For example, hydrogen gas may be transferred to a target vessel from the first vaporization tank 506 and first holding tank 510. Hydrogen gas may also be transferred to another target vessel from the third vaporization tank 518 and second holding tank 520. The second vaporization tank 516 may be used as a refilling tank when the first vaporization tank 506 and the third vaporization tank 518 are in use. Hydrogen gas from the second vaporization tank 516 may be transferred to the first holding tank 510 or the second holding tank 520, or can be used to increase pressure in the first vaporization tank 506 or the third vaporization tank 518.

Figure 6:
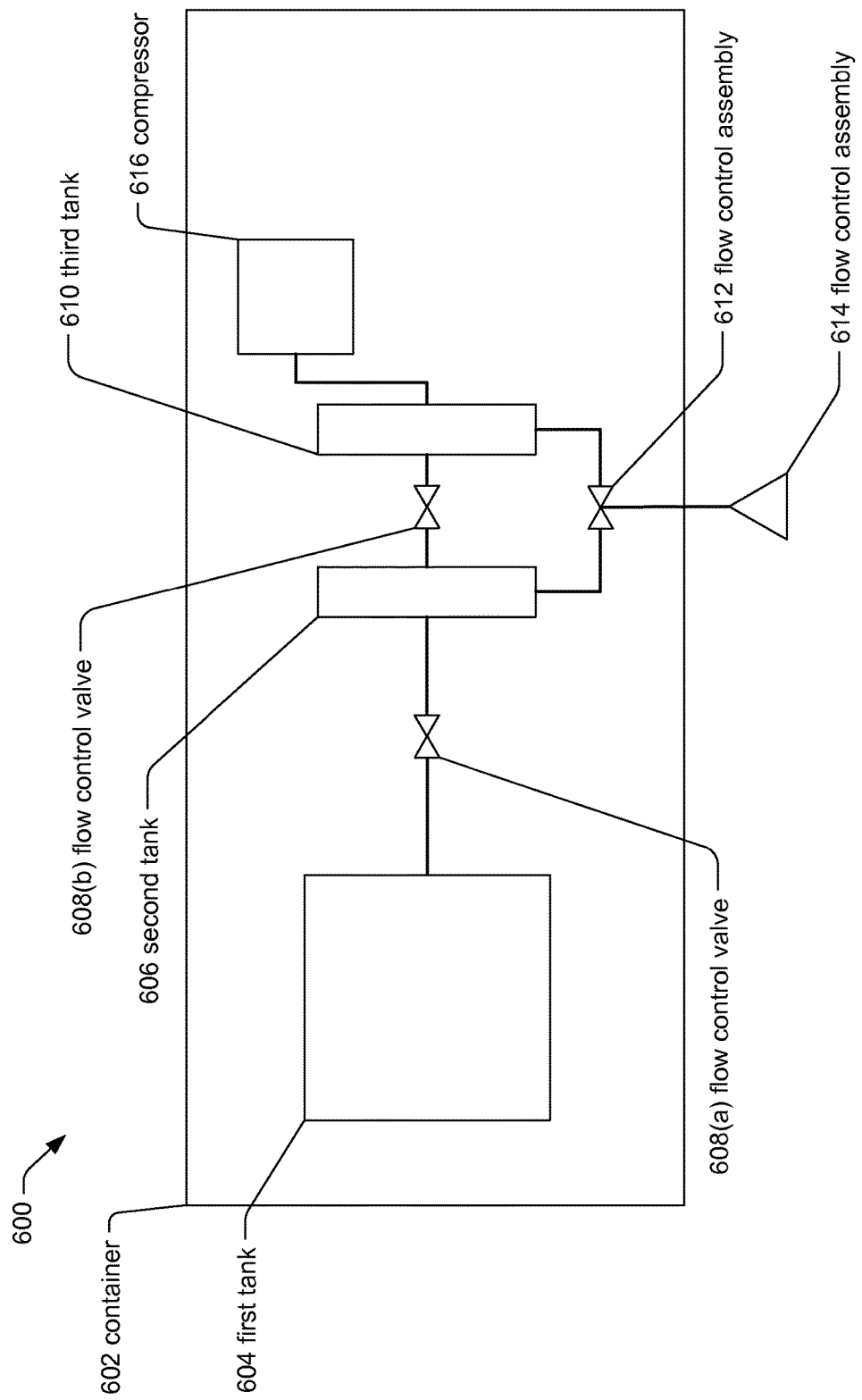
FIG. 6 illustrates a schematic diagram of a further example of a hydrogen fueling system.

FIG. 6 illustrates an example hydrogen fueling system 600 in which a compressor 616 is disposed within the container 602. System 600 may comprise the same or similar components as those shown in FIG. 2. For example, system 600 may comprise a container 602, a first tank 604, a second tank 606, one or more flow control valves 608(a)-(b), a third tank 610, a flow control assembly 612, and a nozzle 614. The compressor 616 may be reciprocating compressor disposed within the container 602. The compressor 616 may be coupled to the third tank 610 (as shown in FIG. 6) and/or to the other components of system 600. In some examples, the compressor 616 may be used to regulate pressure within the first tank 604, the second tank 606, the third tank 610, or a combination thereof. For example, the compressor 616 may be used to force hydrogen gas from the second tank 606 to the third tank 610, or from a fourth tank (such as that depicted in FIG. 3) to the third tank 610. The compressor 616 may also be used to force hydrogen gas from the third tank 610 and/or the second tank 606 to one or more target vessels. In some examples, the compressor 616 may be a gas booster, booster pump, or other pneumatic device. Additionally, system 600 may comprise a liquid pump disposed, for example, between the first tank 604 and the second tank 606. The liquid pump may promote the transfer of liquid hydrogen from the first tank 604 to the second tank 606.

Figure 7:
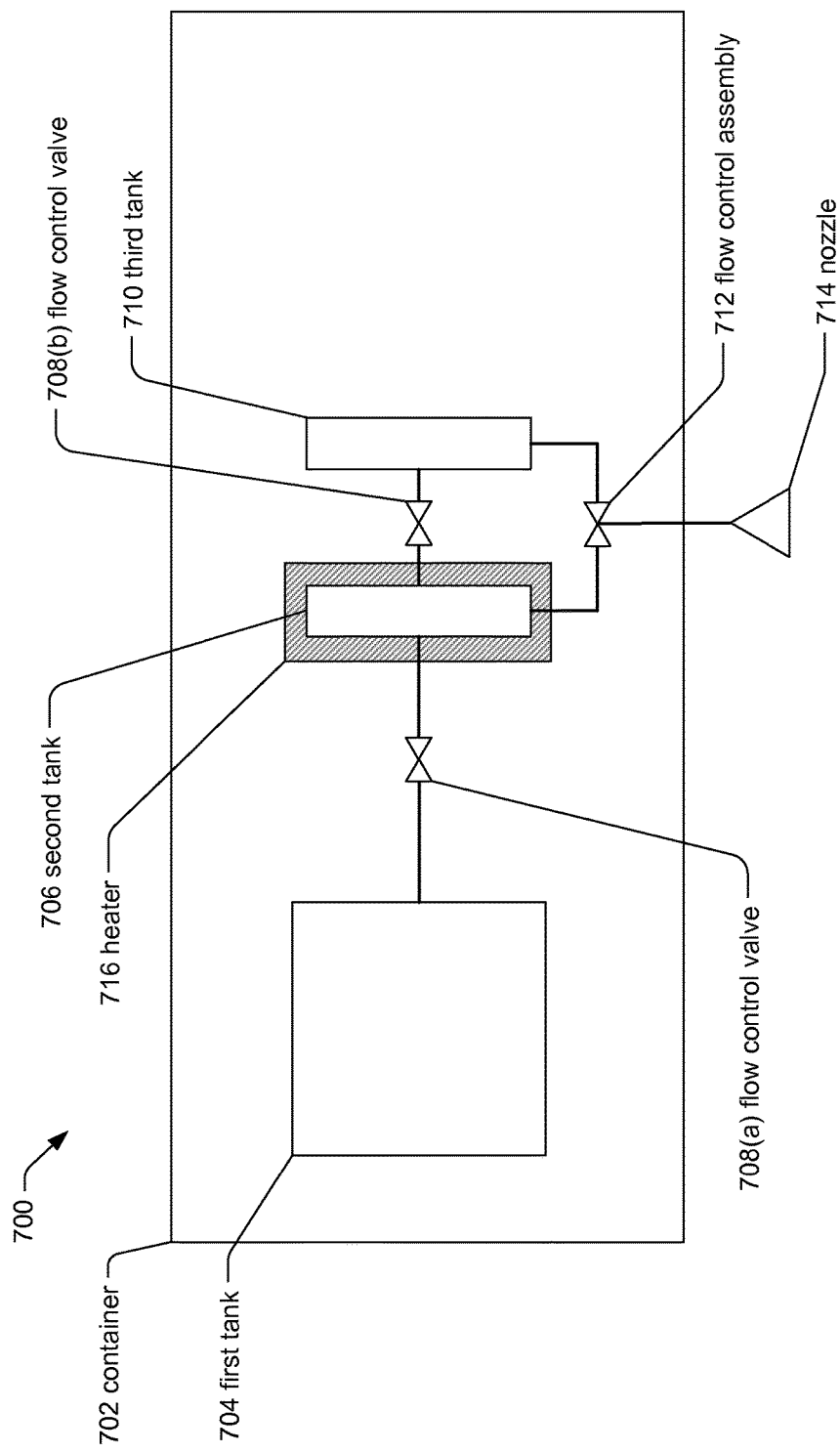
FIG. 7 illustrates a schematic diagram of a further example of a hydrogen fueling system.

FIG. 7 illustrates an example hydrogen fueling system 700 in which a heater 716 is disposed within the container 702. System 700 may comprise the same or similar components as those shown in FIG. 2. For example, system 700 may comprise a container 702, a first tank 704, a second tank 706, one or more flow control valves 708(a)-(b), a third tank 710, a flow control assembly 712, and a nozzle 714. The heater 716 may be coupled to the second tank 706. The heater 716 may be used to promote increased temperature of liquid hydrogen received within the second tank 706. In some examples, the heater 716 may decrease the time needed to vaporize the liquid hydrogen to hydrogen gas. The heater 716 may be activated when desirable to vaporize the liquid hydrogen, and may be deactivated when vaporization has been completed. The heater 716 may be physically attached to the second tank 706, or the heater 716 may be placed in close proximity to the second tank 706. The heater 716 may surround the entire second tank 706 or only a portion of the second tank 706.

Figure 8:
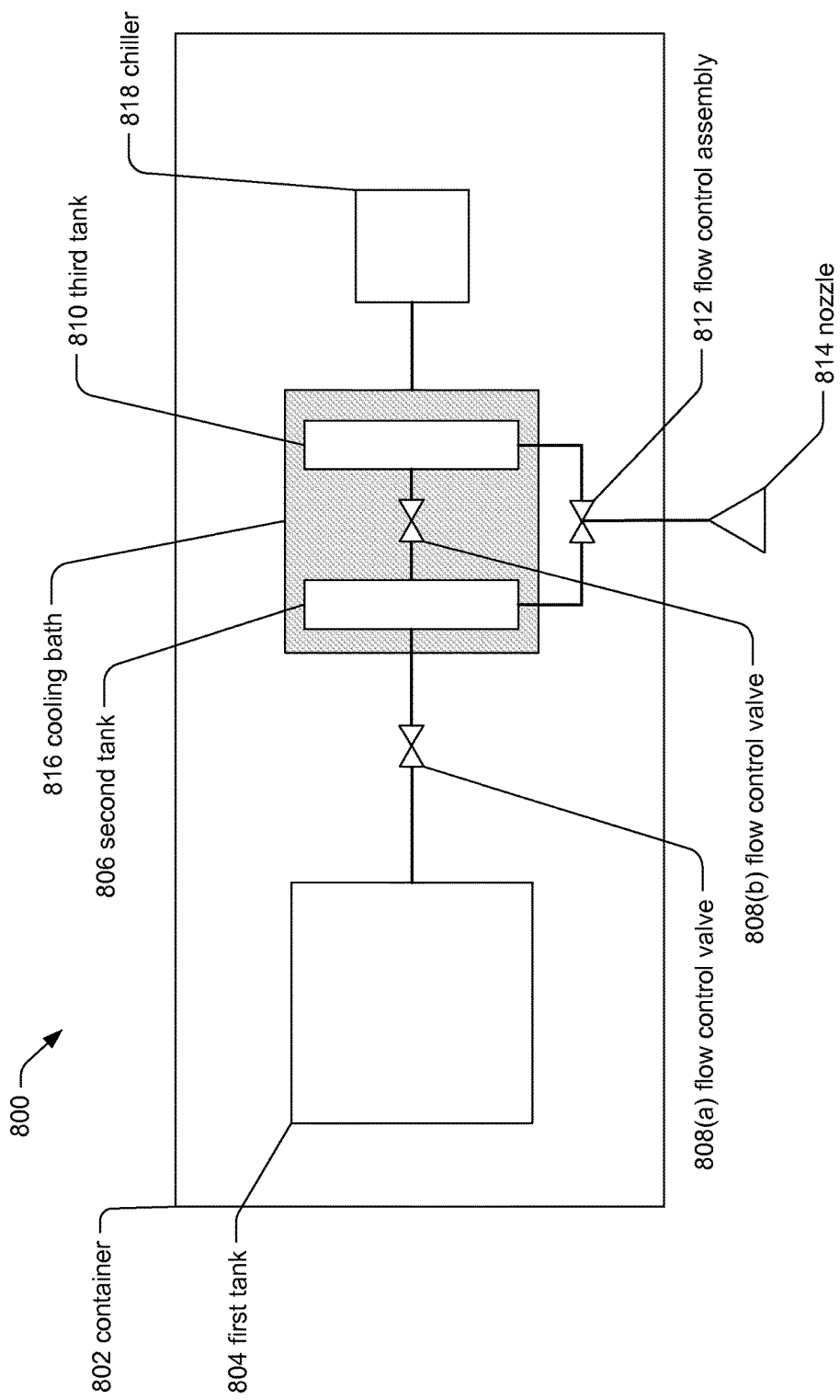
FIG. 8 illustrates a schematic diagram of a further example of a hydrogen fueling system.

FIG. 8 illustrates an example hydrogen fueling system 800 in which a cooling bath 816 is disposed within the container 802. System 800 may comprise the same or similar components as those shown in FIG. 2. For example, system 800 may comprise a container 802, a first tank 804, a second tank 806, one or more flow control valves 808(a)-(b), a third tank 810, a flow control assembly 812, and a nozzle 814. The cooling bath 816 may at least partially surround the second tank 806 and the third tank 810. In some examples, all or a portion of the second tank 806 and the third tank 810 may be submerged in the cooling bath 816. The cooling bath 816 may be filled with a coolant, such as a liquid coolant, that may be circulated by a chiller 818. The chiller 818 may chill or otherwise cool the liquid coolant and circulate the liquid coolant into and out of the cooling bath 816. Any heat transfer fluid may be used as the liquid coolant, such as, for example, potassium formate. The coolant bath 816 may maintain the second tank 806 and the third tank 810 at a desired temperature, such as, for example, about −40° C.

Figure 9:
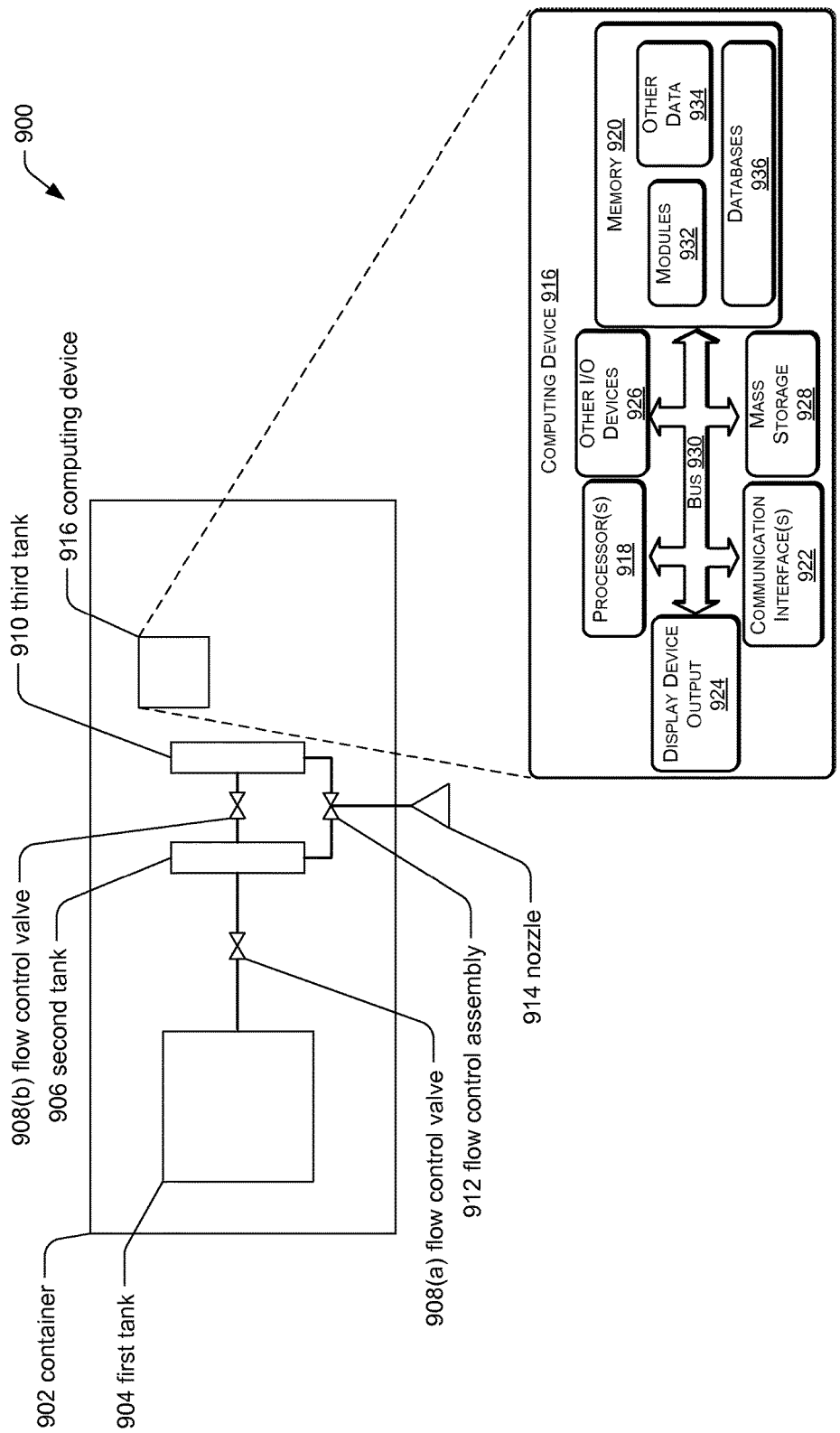
FIG. 9 illustrates a schematic diagram of a further example of a hydrogen fueling system.

FIG. 9 illustrates an example hydrogen fueling system 900 that comprises one or more computing devices 916. System 900 may comprise the same or similar components as those shown in FIG. 2. For example, system 900 may comprise a container 902, a first tank 904, a second tank 906, one or more flow control valves 908(a)-(b), a third tank 910, a flow control assembly 912, and a nozzle 914. The computing devices 916 may be disposed within the container 902 and may include at least one processor 918, a memory 920, communication interfaces 922, a display device output 924, other input/output (I/O) devices 926 (e.g. a touchscreen display or a mouse and keyboard), and one or more mass storage devices 928 able to communicate with each other, such as via a system bus 930 or other suitable connection.

The processor 918 may be a single processing unit or a number of processing units, all of which may include single or multiple computing units or multiple cores. The processor 918 can be implemented as one or more microprocessors, microcomputers, microcontrollers, digital signal processors, central processing units, state machines, logic circuitries, and/or any devices that manipulate signals based on operational instructions. Among other capabilities, the processor 918 can be configured to fetch and execute computer-readable instructions stored in the memory 920, mass storage devices 928, or other computer-readable media.

Memory 920 and mass storage devices 928 are examples of computer storage media for storing instructions which are executed by the processor 918 to perform the various operations described herein. For example, memory 920 may generally include both volatile memory and non-volatile memory (e.g., random access memory (RAM), read-only memory (ROM), or the like). Further, mass storage devices 928 may generally include hard disk drives, solid-state drives, removable media, including external and removable drives, memory cards, flash memory, floppy disks, optical disks (e.g., compact disks (CD), digital versatile disk (DVD)), a storage array, a network attached storage, a storage area network, or the like. Both memory 920 and mass storage devices 928 may be collectively referred to as memory or computer storage media herein, and may be capable of storing computer-readable, processor-executable program instructions as computer program code that can be executed by the processor 918 as a particular machine configured for carrying out the operations and functions described in the implementations herein.

Computer-readable storage media includes volatile and non-volatile, removable and non-removable media implemented in any method or technology for storage of information, such as computer readable instructions, data structures, program modules, or other data. Computer storage media includes, but is not limited to, RAM, ROM, electronically erasable programmable read-only memory (EEPROM), flash memory or other memory technology, CD-ROM, DVD or other optical storage, magnetic cassettes, magnetic tape, magnetic disk storage or other magnetic storage devices, or any other non-transmission medium that can be used to store information for access by a computing device.

The computing device 916 may also include one or more communication interfaces 922 for exchanging data with other devices, such as via a network, direct connection, or the like, as discussed above. The communication interfaces 922 can facilitate communications within a wide variety of networks and protocol types, including wired networks (e.g., local area network (LAN), cable, etc.) and wireless networks (e.g., wireless local area network (WLAN), cellular, satellite, etc.), the Internet and the like. Communication interfaces 922 can also provide communication with external storage (not shown), such as in a storage array, network attached storage, storage area network, or the like. Such communications may be encrypted, such as by utilizing firewalls and/or secure routers.

The display device output 924 may be included in some implementations and may provide information to be displayed on a user interface, such as user interface 112 as shown in FIG. 1. Other I/O devices 926 may be devices that receive various inputs from a user and provide various outputs to the user, and may include a touchscreen, a keyboard, a remote controller, a mouse, a printer, audio input/output devices, and so forth.

Memory 920 may include modules and components for the computing device 916 according to the implementations discussed herein. Memory 920 may include one or more modules 932, such as an operating system, drivers, application software, communication software, command module, or the like. Memory 920 may also include other data 934, such as data stored while performing the operations described above and data used by the modules 932. Memory 920 may also include other data and data structures described or alluded to herein. For example, memory 920 may include information that is used in the course of operating the hydrogen fueling systems described herein or performing the methods of fueling one or more target vessels with hydrogen as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed operations. For instance, in the case of a software implementation, the term "module," "mechanism" or "component" can represent program code (and/or declarative-type instructions) that performs specified tasks or operations when executed on a processing device or devices (e.g., central processing units (CPUs) or processors). The instructions may include one or more algorithms used to perform the operations described herein. Each algorithm may be used to perform one or more processes. For example, algorithms may be used to control the flow of liquid hydrogen and hydrogen gas, to adjusting temperature and/or pressure, and to control the transfer and amount of hydrogen gas from the system to one or more target vessels. The program code can be stored in one or more computer-readable memory devices or other computer storage devices. Thus, the processes, components and modules described herein may be implemented by a computer program product.

The one or more computer-readable storage media storing instructions executable by one or more processors may perform a number of operations. Those operations may include, but are not limited to, controlling flow of liquid hydrogen, when received within the first tank, from the first tank to the second tank. The operations may also include adjusting a temperature of the second tank to at or above a boiling point of hydrogen such that the liquid hydrogen, when received within the second tank, vaporizes to hydrogen gas. The operations may further include controlling flow of the hydrogen gas from the second tank to the third tank. The operations may further include controlling pressure in the first tank, the second tank, and the third tank, the first tank controlled at a first pressure (described herein), the second tank controlled at a second pressure (described herein) that may be greater than the first pressure, and the third tank controlled at a third pressure (described herein) that may be less than or equal to the second pressure. The operations may further include adjusting the temperature of the second tank and a temperature of the third tank. The operations may further include transferring the hydrogen gas from the second tank, the third tank, or a combination thereof to a target vessel. The operations may further include controlling flow of hydrogen gas from the second tank to the fourth tank and controlling the flow of hydrogen gas from the fourth tank to the third tank. The operations may further include sensing and/or monitoring the pressure and temperature of the various components of the systems described herein. Additional operations such as safety checks and cyber-attack prevention may also be performed.

Computing device 916 may also include controllers and sensors to monitor and control the valves and assemblies described in FIGS. 1-9 and to perform the operations described below with respect to FIGS. 10-12.

As described in FIGS. 1-9, various components of systems 100-900 have been described as components of certain examples of the multiple hydrogen fueling systems described herein. However, it should be understood that in some examples each component described herein may be included in any or all of systems 100-900, and the inclusion of a component in one example does not exclude its potential inclusion in other examples. Additionally, multiples of the components of systems 100-900 may also be included. For example, while a number of examples of the presently disclosed systems into a second tank and a third tank, the systems may also include multiple second tanks and multiple third thanks The systems described in FIGS. 1-9 have been shown to reduce the amount of energy and equipment that would be required to deliver and compress gaseous hydrogen for fueling target vessels, such as hydrogen-powered vehicles. These systems may reduce compressor operational costs by an estimated 63% per refuel as compared to a 200 bar gaseous delivery system. These systems may also significantly reduce fueling time. For example, the system may provide for a refueling time of approximately 5 minutes for a hydrogen fuel tank in a hydrogen-powered vehicle.

The systems described in FIGS. 1-9 may also comprise first suppression, surveillance, emergency, and monitoring systems. These systems may allow for communication with police, fire departments, remote operators, and the like in case of emergency. Audio and/or video outputs may be used by the systems to provide commands to the public during emergencies. Fire suppression systems and multi-sensor fire detectors and hydrogen detectors may be installed. Manual main power kill switches may also be installed to manually activate the emergency systems. The top or roof of the container may comprise an explosion relief panel to direct explosions up through the roof and away from people and other equipment. Lighting may be installed on the exterior of the container to provide artificial light for the systems after sunset.

The various tanks described herein may comprise temperature sensors, pressure sensors, and/or pressure relief valves. These sensors and valves may be monitored via remote, real-time monitoring to help increase safety.

EXAMPLE METHODS

Figure 10:
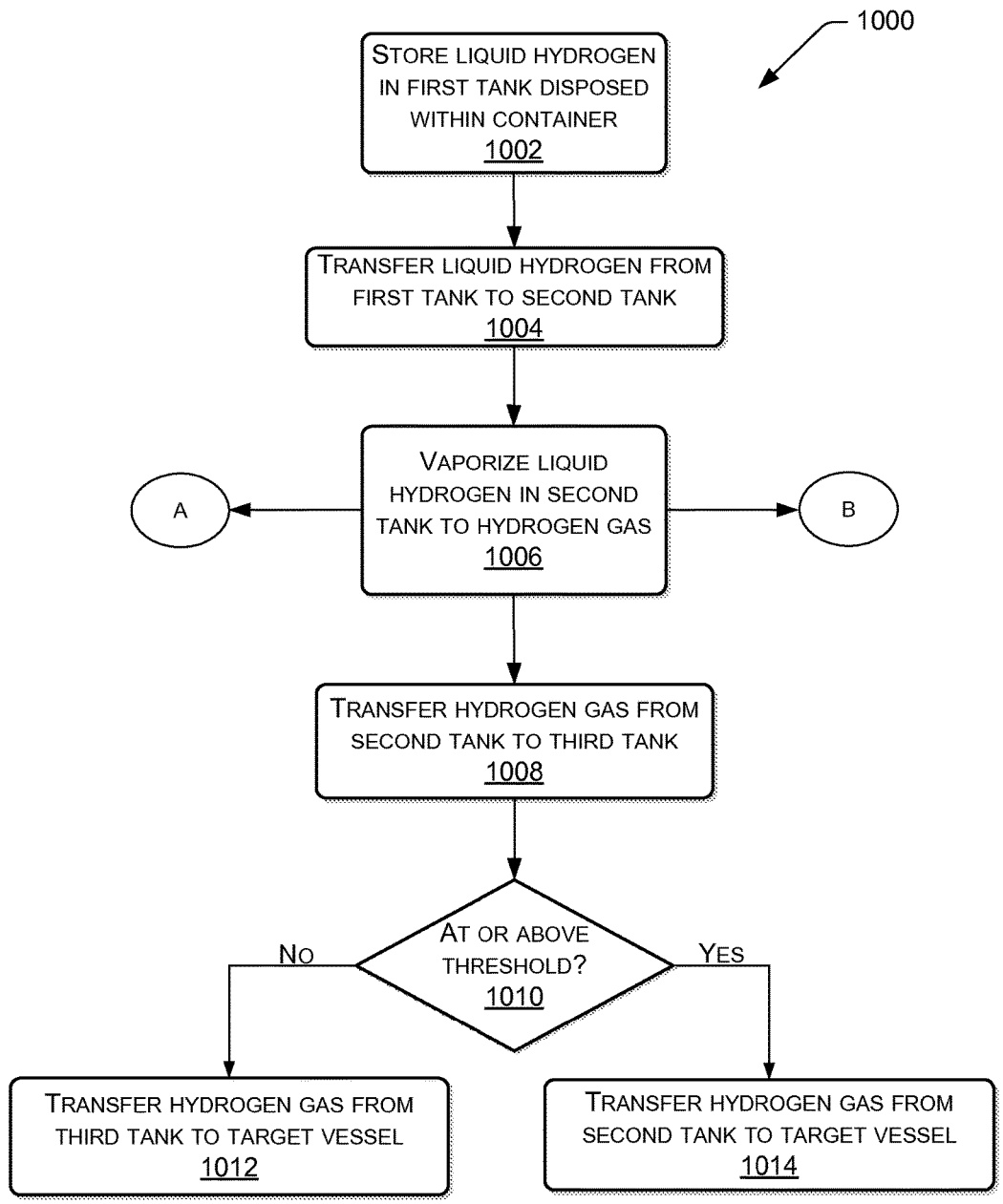
FIG. 10 is a flowchart illustrating an example method by which a hydrogen fueling system may operate.
Figure 11:
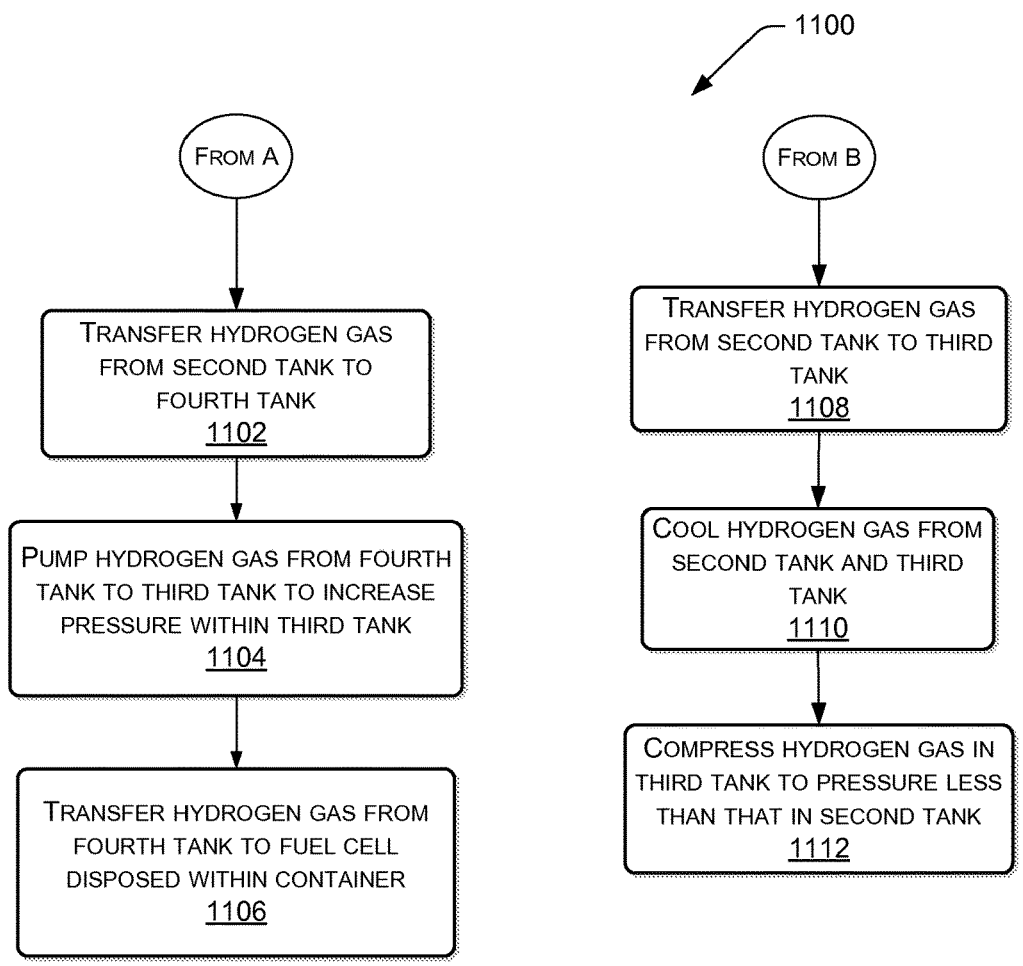
FIG. 11 is a flowchart illustrating additional operations of a hydrogen fueling system.
Figure 12:
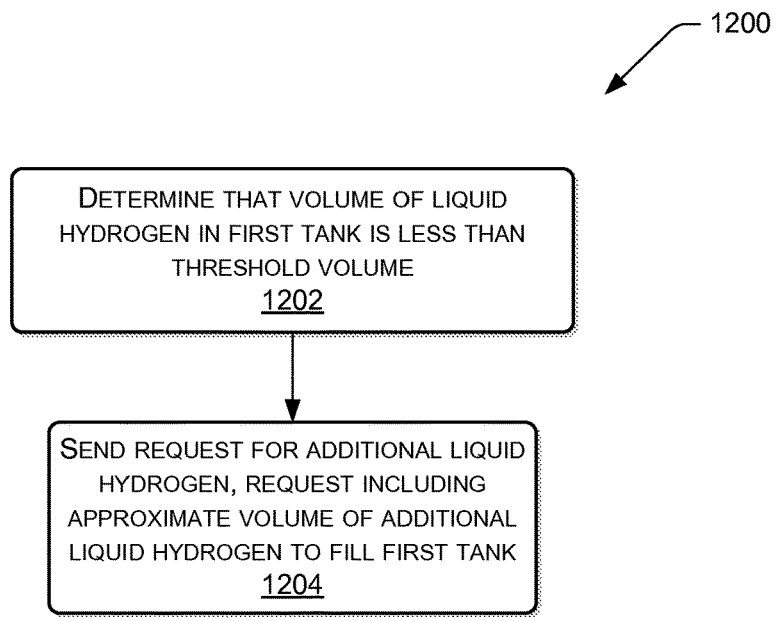
FIG. 12 is a flowchart illustrating further operations of a hydrogen fueling system.

FIGS. 10-12 illustrate example methods of operating a hydrogen fueling station. Methods 1000-1200 are illustrated as logical flow graphs. The order in which the operations or steps are described is not intended to be construed as a limitation, and any number of the described operations can be omitted, modified, or combined in any order and/or in parallel to implement methods 1000-1200.

FIG. 10 illustrates a method 1000 of operating a hydrogen fueling system. At block 1002, method 1000 can comprise storing liquid hydrogen in a first tank, the first tank disposed within a container. Hydrogen will take on a liquid state at atmospheric pressure at approximately −253° C. (−424° F.; 20.3 K). As such, the first tank may be made of materials that hold liquids at such a low temperature. At block 1004, liquid hydrogen may be transferred from the first tank to a second tank. The first tank and the second tank may be coupled to each other to allow the liquid hydrogen to flow from the first tank to the second tank. A valve or other flow controlling means may be used to allow the liquid hydrogen to flow from the first tank to the second tank when desired, and to prevent flow when undesired.

At block 1006, the liquid hydrogen may be vaporized or boiled in the second tank to convert the liquid hydrogen to hydrogen gas. Vaporization may be accomplished by heating the second tank, such as, for example, by using a heating element, or by allowing the second tank to be exposed to ambient temperature. Since liquid hydrogen will vaporize or boil at atmospheric pressure when the temperature is less than approximately −253° C., ambient air will be sufficient to cause vaporization. This may be described as a parasitic heat leak. However, vaporization can be expedited by heating the second tank. As the liquid hydrogen is vaporized, it turns to hydrogen gas. All or a portion of the liquid hydrogen in the second tank may be converted to hydrogen gas. As the liquid hydrogen vaporizes, the temperature and pressure within the second tank may increase. As such, a pressure differential may be present between the first tank and the second tank. By way of example, the first tank may hold liquid nitrogen at atmospheric pressure or at slight pressurization, such as 5 bar. The second tank may hold hydrogen gas at higher pressure, such as, for example, 1,100 bar. Additional operations A and B will be described in detail below with respect to FIG. 11.

At block 1008, at least a portion of the hydrogen gas may be transferred from the second tank to a third tank. The second tank and third tank may be coupled such that hydrogen gas can move from the second tank to the third tank. A valve or other control means may be utilized to allow hydrogen gas to pass from the second tank to the third tank when desired, and to prevent hydrogen gas from passing from the second tank to the third tank when undesired. When hydrogen gas is received within the third tank, the pressure within the third tank may be equal to or less than the pressure in the second tank. By way of example, while pressure in the second tank may be 1,100 bar or more, pressure in the third tank may be less than 1,100 bar, such as, for example, 414 bar. The hydrogen gas may be stored or otherwise maintained in the second tank and the third tank.

At block 1010, method 1000 can include determining when a target vessel contains below, at, or above a threshold percentage of capacity before hydrogen gas is transferred from the system to the target vessel. In some examples, the threshold percentage of capacity may be between 1% and 99%, or between 20% and 90%, or between 40% and 80%, or between 50% and 75%. In some examples, the threshold percentage of capacity may be fixed at 75%. In other examples, the threshold percentage of capacity may be variable.

At block 1012 hydrogen gas may be transferred from the third tank to the target vessel when the target vessel contains below a threshold percentage of capacity. For example, the target vessel may be a hydrogen fuel tank employed on a hydrogen-powered vehicle. The hydrogen fuel tank may be temporarily attached to the third tank, such as, for example, through a nozzle attached to a fueling line. The fueling line and nozzle can be used to transfer the hydrogen gas from the third tank to the hydrogen fuel tank.

At block 1014, hydrogen gas may be transferred from the second tank to the target vessel when the target vessel is at or above a threshold percentage of capacity. Using the same example as used in block 1012, once a hydrogen fuel tank is temporarily attached to the second tank, such as via the same nozzle and fueling line as discussed above, an analysis of the hydrogen fuel tank can be performed to determine if the tank is at or above a threshold percentage of capacity. If the tank is at or above the threshold percentage of capacity, then the hydrogen gas in the second tank may be transferred to the target vessel. The examples provided below illustrate the potential distribution of hydrogen gas from the second tank and the third tank. These examples assume a threshold percentage of 75% tank capacity, which is a non-limiting example.

Example 1 (Target Vessel Initially at 25% of Capacity)

When the target vessel is temporarily attached to the system, an analysis is performed that determines the target tank to be at 25% of capacity. Since the target tank is at only 25% of capacity, hydrogen gas may be transferred from the third tank to the target vessel. The hydrogen gas from the third tank may be transferred to the target vessel until the target vessel reaches 75% of capacity. At that time, hydrogen gas may no longer be transferred from the third tank. Since the target vessel has reached the threshold percentage of capacity, hydrogen gas from the second tank may be transferred to the target vessel until the target vessel has reached full capacity, or until transfer is otherwise terminated.

Example 2 (Target Vessel Initially at 80% of Capacity)

When the target vessel is temporarily attached to the system, an analysis may be performed that determines the target vessel is at 80% capacity. Since the target vessel is already above the 75% threshold percentage of capacity, no hydrogen gas may be transferred from the third tank to the target vessel. Instead, only hydrogen gas from the second tank may be transferred to the target vessel.

Example 3 (Incomplete Transfer)

An analysis determines that the target vessel is at 0% of capacity. Because the target vessel is at less than the 75% threshold percentage of capacity, hydrogen gas may be transferred from the third tank to the target vessel. However, during transfer, the user terminate the transfer process at 70% of the target vessel's capacity. In such an example, hydrogen gas from the second tank may not be transferred into the target vessel because the target vessel did not reach the 75% threshold percentage of capacity.

FIG. 11 illustrates a method 1100, which may be in addition to the operations in method 1000. As shown, method 1100 may start from vaporizing liquid hydrogen in the second tank to hydrogen gas from operation 1006 in method 1000. At block 1102, all or a portion of the hydrogen gas in the second tank may be transferred from the second tank to a fourth tank. The pressure within the fourth tank may be equal to or less than the pressure in the second tank. In some examples, transferring hydrogen gas from the second tank to the fourth tank may be desirable when only a portion of the hydrogen gas from the second tank is transferred to a target vessel, and/or when the third tank has reached capacity. In these and other examples, the fourth tank may be used as a storage tank for hydrogen gas that is not needed in the second tank or the third tank at a particular time. Additionally, at various times, it may be desirable to partially or completely purge the second tank of hydrogen gas and allow the pressure in the second tank to reduce to atmospheric or slightly pressurized pressures. This may allow additional liquid hydrogen to be transferred into the second tank from the first tank. In these and other examples, the hydrogen gas from the second tank may be purged and stored in the fourth tank until it can be used by the third tank or other components of the system as described herein.

At block 1104, all or a portion of the hydrogen gas from the fourth tank may be pumped from the fourth tank to the third tank to increase pressure and/or hydrogen content within the third tank. In some examples, a compressor may be used to force hydrogen gas from the fourth tank to the third tank, especially in circumstances where the pressure in the fourth tank is less than or equal to the pressure in the third tank.

At block 1106, in addition to utilizing the hydrogen gas from the fourth tank to fill the third tank, the hydrogen gas from the fourth tank may also be used to operate a fuel cell disposed within the container. In some examples, the fuel cell may provide operating power to the hydrogen fueling system, such as by providing electrical power to operate the one or more flow control valves, electronic equipment and sensors that determine tank pressures and temperatures, the user interface, compressors, heaters, chillers, monitoring systems, computing devices, and the various other components of the system. The hydrogen fueling system may also comprise a backup or second fuel cell, which may also be powered completely or partially by the hydrogen gas from the fourth tank.

Block 1108 may start from vaporizing liquid hydrogen in the second tank to hydrogen gas from operation 1006 in method 1000. At 1108, hydrogen gas from the second tank may be moved to a third tank. This operation may be the same as or similar to the operation described at block 1008 of method 1000. It should be understood from FIGS. 10 and 11 that hydrogen gas may be transferred from both or either of the second tank or fourth tank into the third tank. Transfer of hydrogen gas from the second tank and the fourth tank may be performed sequentially or in parallel, and when performed sequentially, hydrogen gas may be transferred from the second tank before or after hydrogen gas is transferred from the fourth tank.

At block 1110, hydrogen gas in the second tank and the third tank may be cooled. In some examples, the vaporization of liquid hydrogen in the second tank may increase the temperature of the hydrogen gas within the second tank. Additionally, increased pressure within the second tank and the third tank may also increase the temperature of the hydrogen gas within the second tank and the third tank. In some examples, this increased temperature may be undesirable for dispensing to certain target vessels. For example, some hydrogen fuel tanks in hydrogen-powered vehicles require or recommend the hydrogen gas be at a certain temperature before being dispensed into the hydrogen fuel tanks. That temperature may be, for example, −40° C. However, the temperature of the hydrogen gas within the second tank and third tank may differ from the required or recommended temperature due to heating and pressurization. As such, a chiller or other cooling system may be utilized to cool the second tank and the third tank, which in turn may cool the hydrogen gas within the second tank and the third tank to a desired temperature, such as, for example, −40° C.

At block 1112, hydrogen gas in the third tank may be compressed to a suitable pressure for dispensing into a target vessel. As described above, compression of the hydrogen gas in the third tank may include transferring all or a portion of the hydrogen gas from the fourth tank into the third tank. The compressor may be used to achieve a desired pressurization in the third tank.

FIG. 12 illustrates an example method 1200 of operating a hydrogen fueling system with operations that may be in addition to those described in methods 1000 and 1100.

At block 1202, a computing device, such as one comprising one or more computer-readable storage media storing instructions executable by one or more processors, may determine a volume of the liquid hydrogen in the first tank and if that volume is less than a threshold volume. The threshold volume may be any volume between the first tank's maximum volume and minimum volume. For example, a first tank may be configured to hold enough liquid hydrogen for 1,000 hydrogen-powered vehicles to fill their hydrogen fuel tanks. Given a certain assumed or calculated usage rate, the threshold volume may be set such that the liquid hydrogen is not completely used before additional liquid hydrogen can be received within the first tank.

At block 1204, the computing device may send a request for additional liquid hydrogen to a liquid hydrogen distributor, the station operation, or other individuals or computer systems or networks. The request for additional liquid hydrogen may include the approximate volume of additional liquid hydrogen needed to fill the first tank to a desired percentage of capacity, such as, for example, 100% of capacity. The request may also include additional information about the hydrogen fueling station, its components, its location, its operator(s), or other information that may be helpful in acquiring additional liquid hydrogen.

The term "about" or "approximate" as used in the context of describing a range of volume, pressure, or temperature is to be construed to include a reasonable margin of error that would be acceptable and/or known in the art.

The present description uses numerical ranges to quantify certain parameters relating to the innovation. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds) and provided literal support for and includes the end points of 10 and 100.

The present description uses specific numerical values to quantify certain parameters relating to the innovation, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. These broad, intermediate, and narrow numerical ranges should be applied not only to the specific values, but should also be applied to differences between these specific values.

Furthermore, this disclosure provides various example implementations, as described and as illustrated in the figures. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

This overview, including section titles, is provided to introduce a selection of concepts in a simplified form that are further described below. The overview is provided for the reader's convenience and is not intended to limit the scope of the implementations or claims, nor the proceeding sections.

CONCLUSION

Although the disclosure describes examples having specific structural features and/or methodological acts, it is to be understood that the claims are not necessarily limited to the specific features or acts described. Rather, the specific features and acts are merely illustrative some examples that fall within the scope of the claims of the disclosure.

What is claimed is:

1. A system comprising:
    a container;
    a first tank disposed within the container and sized to receive and store liquid hydrogen;
    a second tank disposed within the container and coupled to the first tank;
    a third tank disposed within the container and coupled to the second tank;
    a nozzle coupled to the second tank and the third tank; and
    one or more processors to perform operations comprising:
        controlling flow of the liquid hydrogen from the first tank to the second tank;
        adjusting a temperature of the second tank to or above a boiling point of hydrogen such that the liquid hydrogen, when received within the second tank, vaporizes to hydrogen gas;
        controlling flow of hydrogen gas from the second tank to the third tank;
        controlling pressure in the first tank to be approximately at a first pressure;
        controlling pressure in the second tank to be approximately at a second pressure greater than the first pressure;
        controlling pressure in the third tank to be approximately at a third pressure less than or equal to the second pressure; and
        transferring the hydrogen gas from the second tank, the third tank, or a combination thereof to a target vessel.

2. The system of claim 1, wherein the first pressure is less than or equal to approximately 5 bar, the second pressure is greater than or equal to approximately 1,100 bar, and the third pressure is between approximately 5 bar and approximately 1,100 bar.

3. The system of claim 1, further comprising:
    a forth tank disposed within the container and coupled to the second tank and to the third tank, the one or more computer-readable storage medium storing instructions executable by one or more processors to control at least one of flow of hydrogen gas from the second tank to the fourth tank or control flow of hydrogen gas from the fourth tank to the third tank.

4. The system of claim 1, wherein the operations further comprise:
adjusting the temperature of the second tank and a temperature of the third tank; and
maintaining a temperature of the second tank and a temperature of the third tank at approximately −40° C.

5. The system of claim 1, wherein the container comprises an intermodal shipping container.

6. The system of claim 1, further comprising:
a footing coupled to the container, the footing having a base to rest one and hold the container above ground level.

7. The system of claim 1, wherein the transferring the hydrogen gas to the target vessel further comprises:
preventing flow of the hydrogen gas from the second tank when the target vessel is below a threshold percentage of capacity; and
preventing flow of the hydrogen gas from the third tank when the target vessel is at or above the threshold percentage of capacity.

8. The system of claim 7, wherein the threshold percentage of capacity is approximately 75 percent of the target vessel capacity.

9. The system of claim 1, further comprising a siding configured to:
cover all or a portion of the container when the container is not in use or is being transported;
move to allow access to components disposed on an exterior of the container; and
protect the components disposed on the exterior of the container from weather conditions.

10. A system comprising:
one or more processors; and
one or more computer-readable media having instructions stored thereon which, when executed by the one or more processors, perform operations comprising:
controlling flow of liquid hydrogen from a first tank disposed within a container and sized to receive and store liquid hydrogen, to a second tank disposed within the container and coupled to the first tank;
adjusting a temperature of the second tank to or above a boiling point of hydrogen such that the liquid hydrogen, when received within the second tank, vaporizes to hydrogen gas;
controlling flow of hydrogen gas from the second tank to a third tank disposed within the container and coupled to the second tank;
controlling pressure in the first tank to be approximately at a first pressure;
controlling pressure in the second tank to be approximately at a second pressure greater than the first pressure;
controlling pressure in the third tank to be approximately at a third pressure less than or equal to the second pressure; and
transferring the hydrogen gas from the second tank, the third tank, or a combination thereof to a target vessel.

11. The system of claim 10, wherein the first pressure is less than or equal to approximately 5 bar, the second pressure is greater than or equal to approximately 1,100 bar, and the third pressure is between approximately 5 bar and approximately 1,100 bar.

12. The system of claim 10, the operations further comprising:
controlling at least one of flow of hydrogen gas from the second tank to a fourth tank disposed within the container and coupled to the second tank and to the third tank, or controlling flow of hydrogen gas from the fourth tank to the third tank.

13. The system of claim 10, the operations further comprising:
adjusting the temperature of the second tank and a temperature of the third tank; and
maintaining the temperature of the second tank and the temperature of the third tank at approximately −40° C.

14. The system of claim 10, wherein the container comprises an intermodal shipping container.

15. The system of claim 10, wherein the container further comprises a footing coupled to the container, the footing having a base to rest one and hold the container above ground level.

16. The system of claim 10, wherein the transferring the hydrogen gas to the target vessel further comprises:
preventing flow of the hydrogen gas from the second tank when the target vessel is below a threshold percentage of capacity; and
preventing flow of the hydrogen gas from the third tank when the target vessel is at or above the threshold percentage of capacity.

17. The system of claim 16, wherein the threshold percentage is a controlled percentage of the target vessel capacity.

18. A system comprising:
a container;
a first tank disposed within the container and sized to receive and store liquid hydrogen;
a second tank disposed within the container and coupled to the first tank;
a third tank disposed within the container and coupled to the second tank;
a fourth tank disposed within the container and coupled to the second tank and to the third tank; and
one or more processors to perform operations comprising:
controlling flow of the liquid hydrogen from the first tank to the second tank;
adjusting a temperature of the second tank to or above a boiling point of hydrogen such that the liquid hydrogen, when received within the second tank, vaporizes to hydrogen gas;
controlling flow of hydrogen gas from the second tank to the third tank;
controlling pressure in the first tank to be approximately at a first pressure;
controlling pressure in the second tank to be approximately at a second pressure greater than the first pressure;
controlling pressure in the third tank to be approximately at a third pressure less than or equal to the second pressure;
controlling at least one of:
flow of hydrogen gas from the second tank to the fourth tank; or
flow of hydrogen gas from the fourth tank to the third tank; and
transferring the hydrogen gas from the second tank, the third tank, or a combination thereof to a target vessel.

19. The system of claim 18, wherein the first pressure is less than or equal to approximately 5 bar, the second pressure is greater than or equal to approximately 1,100 bar, and the third pressure is between approximately 5 bar and approximately 1,100 bar.

20. The system of claim 18, wherein the operations further comprise:
- adjusting the temperature of the second tank and a temperature of the third tank; and
- maintaining a temperature of the second tank and a temperature of the third tank at approximately −40° C.

* * * * *